June 19, 1928.  R. H. WENTORF ET AL  1,674,270
COFFEE PERCOLATOR
Filed Sept. 12, 1923
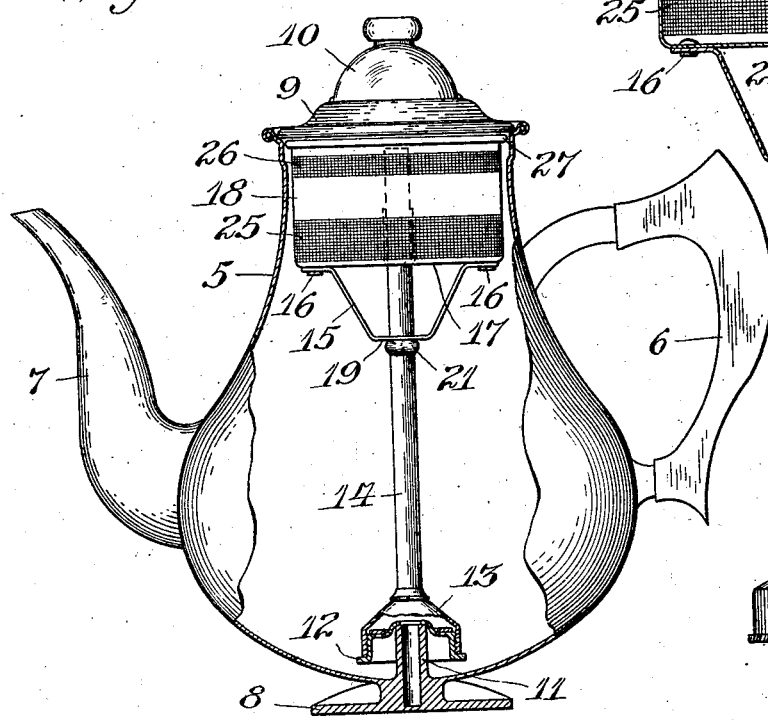
Inventors.
Robert H. Wentorf
and Ralph N. Kircher,
By Sprinkle & Smith
Attys.

Patented June 19, 1928.

1,674,270

UNITED STATES PATENT OFFICE.

ROBERT H. WENTORF AND RALPH N. KIRCHER, OF WEST BEND, WISCONSIN, ASSIGNORS TO WEST BEND ALUMINUM COMPANY, A CORPORATION OF WISCONSIN.

COFFEE PERCOLATOR.

Application filed September 12, 1923. Serial No. 662,173.

This invention relates to a coffee percolator and more particularly to an improved manner of constructing and supporting the coffee basket or container in its proper position.

The invention in this instance is particularly applied to a coffee percolator provided with a coffee basket or container having a plurality of perforations in the bottom and sides thereof. In this type of percolator the basket is entirely supported on a stem or pedestal having its base resting on the bottom of the percolator proper. In percolators of this type the weight of the contents in the basket together with the weight of the basket itself has always been sustained by the perforated bottom of the basket, and which, by reason of the perforations therein has been weakened to such an extent that in many instances the bottom has collapsed or broken through.

It is the primary object of the present invention to overcome this difficulty by providing an improved basket support construction in which the weight of the basket is entirely supported by an inverted arch member having its outer ends secured to the bottom of the basket adjacent the outer walls thereof and having a central connection by means of which the arch member is supported on the stem.

A further object of the invention is to provide a strong and efficient construction of a basket support.

These and other objects are obtained by providing a construction and an arrangement of the various parts in the manner hereinafter described and particularly pointed out in the appended claims.

Referring to the drawing:

Fig. 1 is a cross sectional view of a percolator showing our new improved means for supporting the coffee basket or container embodied therein.

Fig. 2 is a side elevational view partly in section of the stem or pedestal showing our improved coffee container mounted thereon, and Fig. 3 is an enlarged bottom plan view of our improved arch support showing the manner in which it is secured to the coffee container.

For purposes of illustration we have shown our improved coffee container or basket and the support therefor mounted in a coffee percolator proper or receptacle 5, provided with the usual non-heat conducting handle 6, spout 7, pedestal 8 and pivoted top 9 with the glass dome 10. The pedestal 8 is provided with a hot well in the form of a tubular member 11, which extends upwardly and is adapted to receive and support thereon a valve base 12. The valve base 12 is adapted to be connected with the valve canopy 13 by threaded engagement therewith. The canopy 13 is securely fixed to the vertical stem 14 in any well known manner, preferably, by being riveted thereto. The construction just described, that is, the valve base 12, canopy 13 and stem 14 form a pedestal with the valve base resting upon the tubular member 11 in such a manner as to form a support for the improved basket or coffee container hereinafter described.

An important feature of our improved basket or coffee container comprises a provision of means for supporting the weight thereof by providing an inverted arch-shaped member 15 having its upper and outer ends thereof secured by means of rivets 16 to the perforated bottom 17 of a basket 18. The central portion of the arch-shaped member is disposed horizontally as shown at 19 and enlarged at this point, as clearly shown in Fig. 3. Extending through the horizontally disposed portion 19 is an aperture 20 which is adapted to slidably receive the stem 14. The stem 14 is adapted to extend through the aperture 20 until the enlarged portion 19 of the arch member 15 rests upon an embossed bead 21 formed integrally on the stem member 14 at a point intermediate its ends. By this construction the entire weight of the coffee basket is entirely sustained by the outer edges of the bottom of the basket by the inverted arch member, which in turn rests on the embossed bead 21 of the stem 14. The upper portion of the stem 14, as shown at 22 extends through a tubular member 23 secured in the aperture 24 formed centrally in the base 17 of the basket 18. The basket 18 is provided with the usual wall perforations 25 and 26 spaced from each other, as clearly shown in Figs. 1 and 2. The basket 18 is further provided with an outwardly curled reinforcing bead 27. By referring to Fig. 1 it will be noted that the basket 18 is positioned within the percolator proper or receptacle 5 and is entirely supported on the stem 14 through the medium of the inverted arch support 15 having its horizontal portion 19 engaging the embossed bead 21 of the stem 14.

By this construction we have provided a very efficient and yet simple construction of coffee container and support therefor, which will preclude the possibility of crushing the perforated bottom as commonly experienced in devices of this type.

While in the above specification we have described one embodiment which our invention may assume in practice, it will be understood that various other forms may be made and be within the contemplation of our invention.

What we claim as our invention and desire to secure by Letters Patent is:

1. A coffee percolator comprising a receptacle, a tubular stem mounted on the bottom of the receptacle and being supported thereby, an annular enlarged portion on the stem adjacent its upper end, a coffee basket provided with a central tubular portion adapted to telescope over the upper end of said tubular stem, means for supporting the said coffee basket on the upper end of said tubular stem comprising a unitary inverted arch member comprising a perforated intermediate portion adapted to be spaced apart from the bottom of the said coffee basket in contact with the said enlarged annular portion on the tubular stem, and extensions on the said arch member on diametrically opposite sides of the tubular member extending radially upwardly to the bottom of the basket and secured thereto adjacent the outer periphery of the basket.

2. The combination in a coffee percolator comprising a receptacle, of a tubular stem mounted in the bottom of said receptacle and extending toward the top thereof, an annular enlarged portion formed integrally with said tubular stem intermediate the ends of said stem, a coffee basket having a tubular member secured centrally in the bottom thereof and forming a telescoping connection with said stem on the end thereof above the said annular enlarged portion, and a unitary supporting member in the form of an inverted arch comprising an enlarged intermediate portion perforated to telescope over the tubular member and to rest in a horizontal position on the top of said enlarged annular portion of the tubular member, the end portions thereof being extended on diagrammatically opposite sides of the tubular member upwardly from the said intermediate portion to the bottom of the coffee basket and thence deflected horizontally and secured to the bottom of said basket for rotatably and detachably securing the said basket in position to be supported on the upper end of said tubular member.

3. As an article of manufacture, a coffee basket for percolators comprising a sheet metal receptacle of substantially cylindrical form, the bottom thereof being provided with a central perforation adapted to telescope over the upper end of a tubular support for said basket, and a bracket comprising a member formed of sheet metal having a perforated intermediate portion adapted to be spaced apart from the bottom of the said basket, the said intermediate portion lying in a plane approximately parallel with the bottom of the basket and being adapted to be supported on the top of an annular enlargement on the tubular stem of a percolator, the diagrammatically opposite ends of the said supporting member being extended upwardly and outwardly beyond the said intermediate portion thereof to engage the bottom of the cylindrical basket adjacent the outer periphery thereof and being thence deflected into substantial parallelism with the bottom of the basket adjacent their respective outer extremities and fixed to the bottom of the basket.

In testimony whereof we have signed our names to this specification on this 6th day of September, A. D. 1923.

ROBERT H. WENTORF.
RALPH N. KIRCHER.